(12) United States Patent
Lee et al.

(10) Patent No.: US 11,638,129 B2
(45) Date of Patent: Apr. 25, 2023

(54) METHOD FOR OPERATING TERMINAL FOR V2X COMMUNICATION IN WIRELESS COMMUNICATION SYSTEM AND TERMINAL USING SAME METHOD

(71) Applicant: LG Electronics Inc., Seoul (KR)

(72) Inventors: Jongyoul Lee, Seoul (KR); Youngtae Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/626,423

(22) PCT Filed: Jun. 26, 2018

(86) PCT No.: PCT/KR2018/007200
§ 371 (c)(1),
(2) Date: Dec. 24, 2019

(87) PCT Pub. No.: WO2019/004688
PCT Pub. Date: Oct. 31, 2009

(65) Prior Publication Data
US 2020/0162864 A1 May 21, 2020

Related U.S. Application Data

(60) Provisional application No. 62/524,628, filed on Jun. 26, 2017.

(51) Int. Cl.
*H04W 4/40* (2018.01)
*H04W 64/00* (2009.01)
(Continued)

(52) U.S. Cl.
CPC ............ *H04W 4/40* (2018.02); *G01S 19/10* (2013.01); *H04L 1/1819* (2013.01); *H04L 5/0055* (2013.01); *H04W 64/003* (2013.01)

(58) Field of Classification Search
CPC .... H04W 4/40; H04W 64/003; H04L 5/0055; H04L 1/1819; G01S 19/10
See application file for complete search history.

(56) References Cited

U.S. PATENT DOCUMENTS 9,591,603 B2    3/2017   Shaw et al.
9,830,816 B1 *  11/2017  Murray ................ H04B 17/12
(Continued)

FOREIGN PATENT DOCUMENTS

CN    103313406     9/2013
CN    103763744     4/2014
(Continued)

OTHER PUBLICATIONS

Extended European Search Report in European Appln. No. 18825253.0, dated Jun. 23, 2020, 10 pages.
(Continued)

*Primary Examiner* — Muthuswamy G Manoharan
(74) *Attorney, Agent, or Firm* — Fish & Richardson P.C.

(57) ABSTRACT

Provided are a method for operating a terminal for vehicle-to-everything (V2X) communication in a wireless communication system, and a terminal using the method. The method includes receiving data from another terminal, and transmitting an acknowledgment/negative-acknowledgment (ACK/NACK) for the data only when the distance to the another terminal is equal to or less than a predetermined value.

6 Claims, 16 Drawing Sheets

(51) Int. Cl.
*G01S 19/10* (2010.01)
*H04L 1/18* (2006.01)
*H04L 5/00* (2006.01)
*H04L 1/1812* (2023.01)

(56) References Cited

U.S. PATENT DOCUMENTS

| | | |
|---|---|---|
| 9,875,589 B1 * | 1/2018 | Buttolo .............. G07C 9/00571 |
| 10,721,592 B2 * | 7/2020 | He ..................... H04W 8/005 |
| 2008/0160912 A1 | 7/2008 | Kim et al. |
| 2010/0195587 A1 | 8/2010 | Ratasuk et al. |
| 2011/0080302 A1 * | 4/2011 | Muthaiah ............ H04W 12/069 |
| | | 340/903 |
| 2011/0183683 A1 | 7/2011 | Das et al. |
| 2014/0204847 A1 | 7/2014 | Belleschi et al. |
| 2015/0163767 A1 | 6/2015 | Shaw et al. |
| 2015/0358778 A1 | 12/2015 | Heo et al. |
| 2015/0373719 A1 | 12/2015 | Xu et al. |
| 2016/0261438 A1 | 9/2016 | Fritz et al. |
| 2018/0367261 A1 * | 12/2018 | Gonzalves Serrano ..................... |
| | | H04L 1/0027 |

FOREIGN PATENT DOCUMENTS

| | | |
|---|---|---|
| CN | 105139583 | 12/2015 |
| CN | 105810012 | 7/2016 |
| CN | 106878919 | 6/2017 |
| KR | 20160094031 | 8/2016 |
| WO | WO2014074681 | 5/2014 |
| WO | WO2015099925 | 7/2015 |
| WO | WO2016/200184 | 12/2016 |
| WO | WO2017043188 | 3/2017 |
| WO | WO2017/103662 | 6/2017 |
| WO | WO-2018220301 A * | 12/2018 ............. H04L 1/008 |

OTHER PUBLICATIONS

Kondo et al., "A Design and Evaluation of a Geolocation-Aware Reliable Multicast System on Wireless Networks," 2011 IEEE/IPSJ International Symposium on Applications and the Internet, Munich, Bavaria, Jul. 2011, pp. 408-413.

Japanese Office Action in JP Appln. No. 2020-520415, dated Feb. 2, 2021, 8 pages (with English translation).

Korean Office Action in KR Appln. No. 10-2019-7037706, dated Jan. 18, 2021, 9 pages (with English translation).

Office Action in Chinese Appln. No. 201880043025.6, dated Sep. 15, 2022, 15 pages (with English translation).

Suzuki et al., "A Design and Evaluation of a Geolocation-aware Reliable Multicast System on Wireless Networks," IEEE/IPSJ International Symposium on Applications and the Internet, 2011, 6 pages.

* cited by examiner

METHOD FOR OPERATING TERMINAL FOR V2X COMMUNICATION IN WIRELESS COMMUNICATION SYSTEM AND TERMINAL USING SAME METHOD

CROSS-REFERENCE TO RELATED APPLICATIONS

This application is a National Stage application under 35 U.S.C. § 371 of International Application No. PCT/KR2018/007200, filed on Jun. 26, 2018, which claims the benefit of U.S. Provisional Application No. 62/524,628, filed on Jun. 26, 2017. The disclosures of the prior applications are incorporated by reference in their entirety.

BACKGROUND OF THE DISCLOSURE

Field of the Disclosure

The present disclosure relates to wireless communication, and more particularly, to a method for operating a terminal for V2X communication in a wireless communication system and a terminal using the method.

Related Art

There is a growing interest in a Device-to-Device (D22) technology in which devices perform direct communication. In particular, D2D has been in the spotlight as a communication technology for a public safety network. The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, in long term evolution-advanced (LTE-A), an interface between a terminal and a terminal is referred to as sidelink, and the sidelink may also be used for a communication between terminals installed on vehicles or between a terminal installed on a vehicle and another arbitrary terminal, that is, vehicle-to-everything (V2X) communication.

In V2X communication in the existing wireless communication system, no HARQ (hybrid automatic repeat request) operation was applied. From the point of view of a receiving UE, an HARQ operation may include transmission of an acknowledgement/negative-acknowledgement (ACK/NACK) of received data (e.g., packets) and re-reception of data for which an NACK is sent. From the point of view of a transmitting UE, the HARQ operation may include transmission of data, reception of an ACK/NACK for the data, and re-transmission of data for which an NACK is generated. In HARQ, the original erroneous packet and a re-transmitted (re-received) packet are combined to attempt decoding. The transmitting UE may transmit the re-transmitted packet while increasing channel coding gain.

Such an HARQ operation may be applied to V2X communication in a future wireless communication system. However, in V2X communication, for example, communications between terminals installed on vehicles, the terminals move very fast, and their direction of movement may vary, which may lead to a rapid change in the channel status between the terminals. When adopting the HARQ operation to V2X communication, a terminal operation method and apparatus using this feature is required.

SUMMARY OF THE DISCLOSURE

The present disclosure provides a method for operating a terminal for V2X communication in a wireless communication system and a terminal using the method.

In one aspect, provided is a method for operating a first terminal for vehicle-to-everything (V2X) communication in a wireless communication system. The method includes receiving data from a second terminal, transmitting acknowledgement/negative-acknowledgement (ACK/NACK) for the data only when a distance to the second terminal is equal to or smaller than a specific value.

The distance may be determined based on at least one between the geographic distance and radio distance to the second terminal.

The geographic distance may be determined based on global navigation satellite system (GNSS) information or coordinate values received from the second terminal.

The GNSS information or the coordinate values may be included in scheduling assignment (SA) information received from the second terminal.

The radio distance may be determined based on the reference signal received power (RSRP) or reference signal received quality (RSRQ) measured using a reference signal received from the second terminal.

If the RSRP or RSRQ is greater than a threshold, it may be determined that the distance to the second terminal is equal to or smaller than a specific value.

If the RSRP or RSRQ is equal to or smaller than the threshold, no ACK/NACK for the data may be transmitted.

The distance to the second terminal may be determined based on the rate of temporal change in the RSRP or RSRQ of a reference signal periodically received from the second terminal.

If the RSRP or RSRQ of a reference signal periodically received from the second terminal is expected to decrease over time to a threshold or below after a specific point in time, no ACK/NACK for the received data may be transmitted after the specific point in time.

The data may be a V2X (vehicle-to-everything) signal.

The type of information the first terminal will give feedback about may be determined based on the distance to the second terminal.

The first terminal and the second terminal may be terminals installed on vehicles.

In another aspect, provided is a user equipment (UE). The UE includes a transceiver that sends and receives a radio signal and a processor that operates by being connected to the transceiver. The processor receives data from another terminal, and transmits acknowledgement/negative-acknowledgement (ACK/NACK) for the data only when the distance to the another terminal is equal to or smaller than a specific value.

As the geographic or radio distance between terminals performing V2X communication becomes longer, a data transmitting UE may not be able to receive an ACK/NACK signal even if a data receiving UE transmits this ACK/NACK signal. In this case, transmitting ACK/NACK creates unnecessary interference with other terminals and is inefficient in terms of resource utilization. In view of this, in the present disclosure, whether to transmit ACK/NACK is decided depending on the geographic/radio distance between terminals performing V2X communication. Consequently, it is possible to support HARQ operation in V2X communication efficiently in terms of resource utilization, without creating any unnecessary interference with other terminals.

DESCRIPTION OF EXEMPLARY EMBODIMENTS

The technical features to be described below may be used in communication standards established by 3rd Generation Partnership Project (3GPP) standardization organizations or communication standards established by Institute of Electrical and Electronics Engineer (IEEE) standardization organizations. For example, the communication standards established by the 3GPP standardization organizations include Long Term Evolution (LTE) and/or enhancements of the LTE systems. The enhancements of the LTE systems include LTE-A (Advanced), LTE-A Pro, and/or 5G New Radio (NR). The communication standards established by the IEEE standardization organizations include wireless local area network systems such as IEEE 802.11a/b/g/ac/ax. The aforementioned systems use various multiple access technologies such as Orthogonal Frequency Division Multiple Access (OFDMA), and/or Single Carrier-Frequency Division Multiple Access (SC-FDMA) in uplink and/or downlink. For example, the OFDMA can be used only in downlink, and the SC-FDMA can be used only in uplink. Alternatively, the OFDMA and SC-FDMA can be used in combination in uplink and/or downlink.

Figure 1:
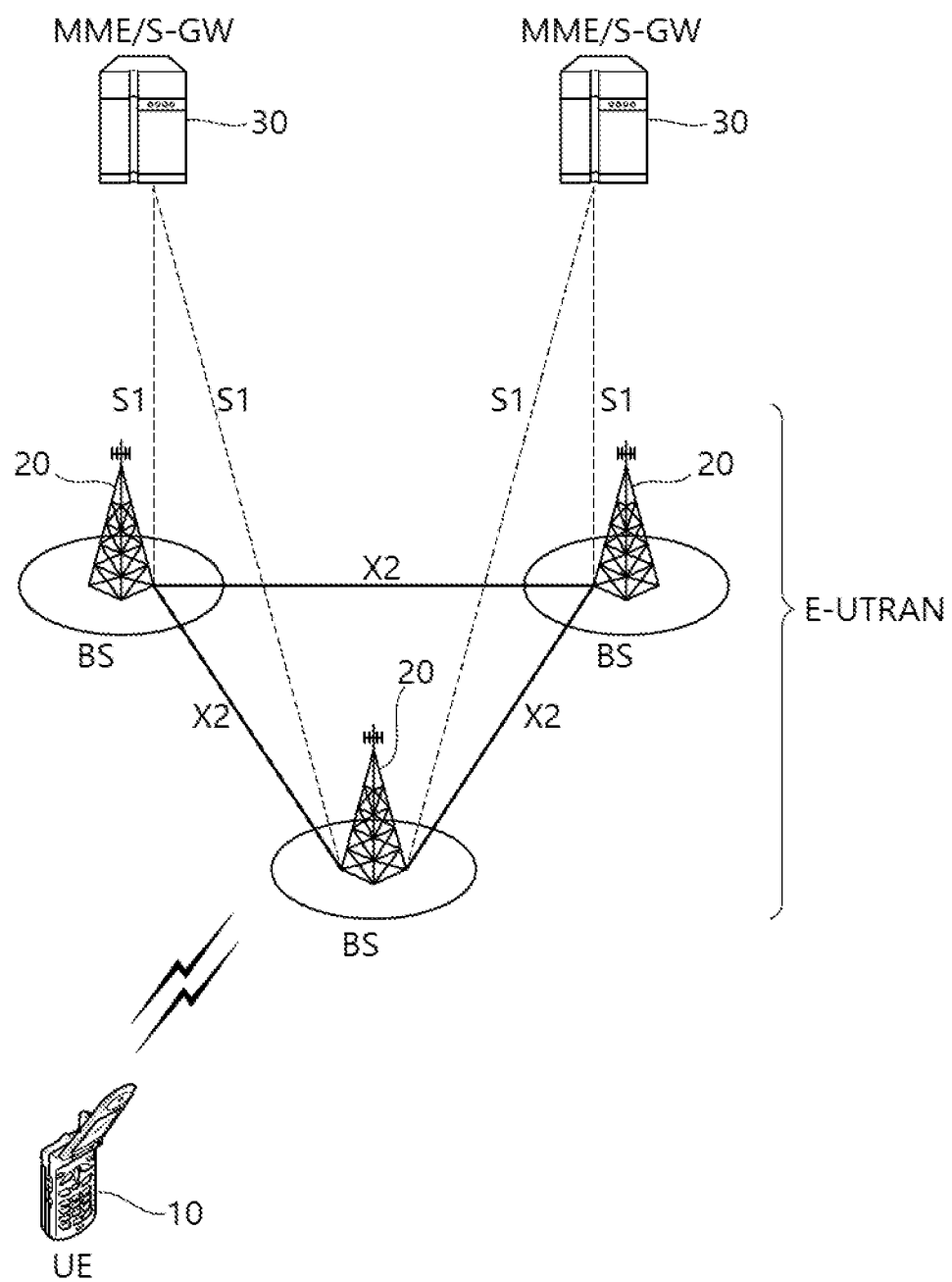
FIG. 1 shows an example of a wireless communication system to which the technical features of the present specification can be applied.

FIG. 1 shows an example of a wireless communication system to which technical features of the present embodiment may apply. Specifically, FIG. 1 shows an example based on Evolved-Universal Terrestrial Radio Access Network (E-UTRAN). The aforementioned LTE is part of Evolved-UMTS (E-UMTS) which uses Evolved-Universal Terrestrial Radio Access Network (E-UTRAN).

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), a wireless device, and a station (STA). The base station 20 generally represents a fixed station that communicates with the UE 10, and may be referred to as other terms such as an evolved-NodeB (eNB), a base transceiver system (BTS), and an access point.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Figure 2:
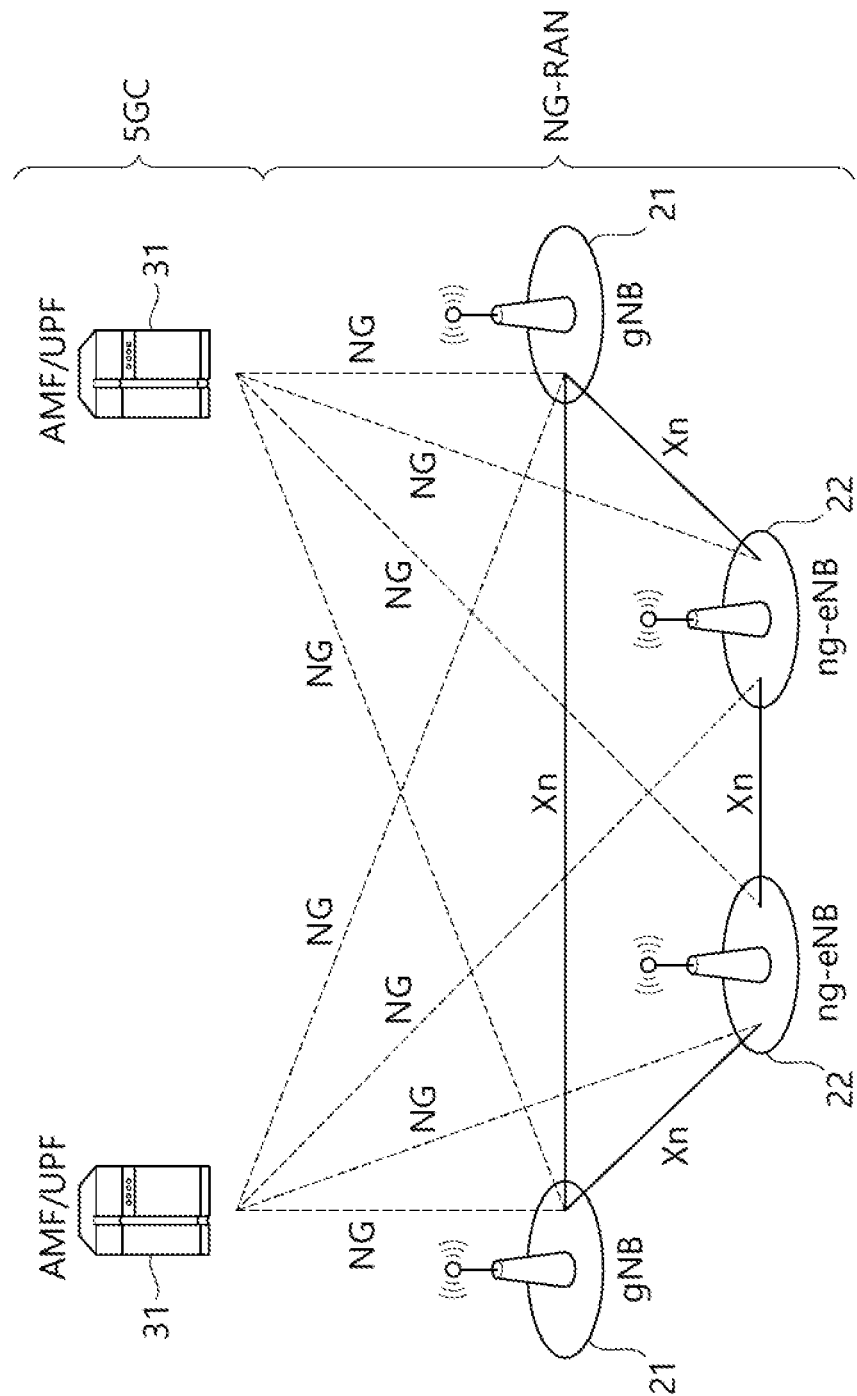
FIG. 2 shows another example of a wireless communication system to which the technical features of the present specification can be applied.

FIG. 2 shows another example of a wireless communication system to which technical features of the present embodiment may apply. Specifically, FIG. 2 shows an example in which 5G New Radio (NR) standards are used. A communication entity used for the 5G NR standards absorbs some or all of the functions of the entity (e.g., eNB, MME, and S-GW) introduced in FIG. 1, which may be identified by the name "NG" so as to distinguish these standards from the existing/conventional standards.

The system of FIG. 2 includes NG-Radio Access Network (RAN) which communicates with the UE, and the NG-RAN 21 and 22 are entities corresponding to base stations and includes gNB 21 or ng-eNB 22. A network interface, which is called an Xn interface, is defined between the NG-RAN entities 21 and 22. The gNB 21 provides an NR user plane and control plane for the UE, and accesses 5G Core network (5GC) through an NG interface shown in FIG. 2. The Ng-eNB 22 is an entity that provides Evolved-Universal Terrestrial Radio Access (UTRA)-based user plane and control plane for the UE, and accesses the 5GC through the NG interface.

The Access and Mobility Management Function (AMF) is an entity that includes the conventional MME function, and communicates with the NG-RAN 21 and 22 through an NG-C interface. The NG-C interface is a control plane interface between the NG-RAN and the AMF.

The User Plane Function (UPF) is an entity that includes the conventional S-GW function, and communicates with the NG-RAN 21 and 22 through an NG-U interface. The NG-U interface is a user plane interface between the NG-RAN and the AMF.

In the system of FIG. 1 and/or FIG. 2, layers of a radio interface protocol between the network (e.g., NG-RAN and/or E-UTRAN) and the UE can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service using a physical channel, and a radio resource control (RRC) layer belonging to the third layer serves to control a radio resource between the UE and the network. To this end, the RRC layer exchanges an RRC message between the UE and the BS.

Hereinafter, the structure of a radio frame sent and received through a physical channel will be described.

In the LTE standards (and the enhancements of the LTE standards), one radio frame includes 10 subframes, and one subframe includes two slots. The length of one subframe may be 1 ms, and the length of one slot may be 0.5 ms. The time during which one subframe is transmitted is referred to as a Transmission Time Interval (TTI). The TTI may be a minimum unit regarding scheduling.

Unlike the LTE standards, the NR standards support various numerologies, and therefore a variety of radio frame structures are established. The NR standards support a plurality of subcarrier spacings in the frequency domain, and NR numerologies are determined by the numerology being used. The following Table 1 tabulates multiple numerologies supported by NR. Each numerology is identified by the index "$\mu$.".

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, the subcarrier spacing may be set to either 15, 30, 60, 120, or 240 kHz, and its specific numerical value may be varied. Thus, each spacing (e.g., $\mu$=0, 1, . . . , 4) may be denoted by the first, second, . . . , Nth subcarrier spacing.

As shown in Table 1, some subcarrier spacings may not be used to send user data (for example, Physical Uplink Shared Channel (PUSCH), Physical Downlink Shared Channel (PDSCH), etc.). That is, user data transmission may not be supported for at least one preset subcarrier spacing (for example, 240 kHz).

Moreover, as shown in Table 1, synchronous channels (for example, Primary Synchronization Signal (PSS), Secondary Synchronization Signal (SSS), Physical Broadcast Channel (PBCH), etc.) may not be supported for some subcarrier spacings. That is, synchronous channels may be supported for at least one subcarrier spacing (e.g., 60 kHz).

In the NR standards, the number of slots and the number of symbols may be set differently depending on various numerologies, that is, various subcarrier spacings. A detailed example of this will be given in the following Table 2.

TABLE 2

| $\mu$ | Number of symbols in a slot | Number of slots in a radio frame | Number of slots in a subframe |
|---|---|---|---|
| 0 | 14 | 10 | 1 |
| 1 | 14 | 20 | 2 |
| 2 | 14 | 40 | 4 |

TABLE 2-continued

| $\mu$ | Number of symbols in a slot | Number of slots in a radio frame | Number of slots in a subframe |
|---|---|---|---|
| 3 | 14 | 80 | 8 |
| 4 | 14 | 160 | 16 |

According to Table 2, in the first numerology in which "$\mu$=0", one radio frame includes 10 subframes, one subframe corresponds to 1 slot, and 1 slot includes 14 slots. In the present embodiment, the term 'symbol' means a signal transmitted during a specific time period—for example, a signal generated by Orthogonal Frequency Division Multiplexing (OFDM) processing. That is, the term 'symbol' used herein may refer to an OFDM/OFDMA symbol or an SC-FDMA symbol. A cyclic prefix (CP) may be positioned between each symbol.

Figure 3:
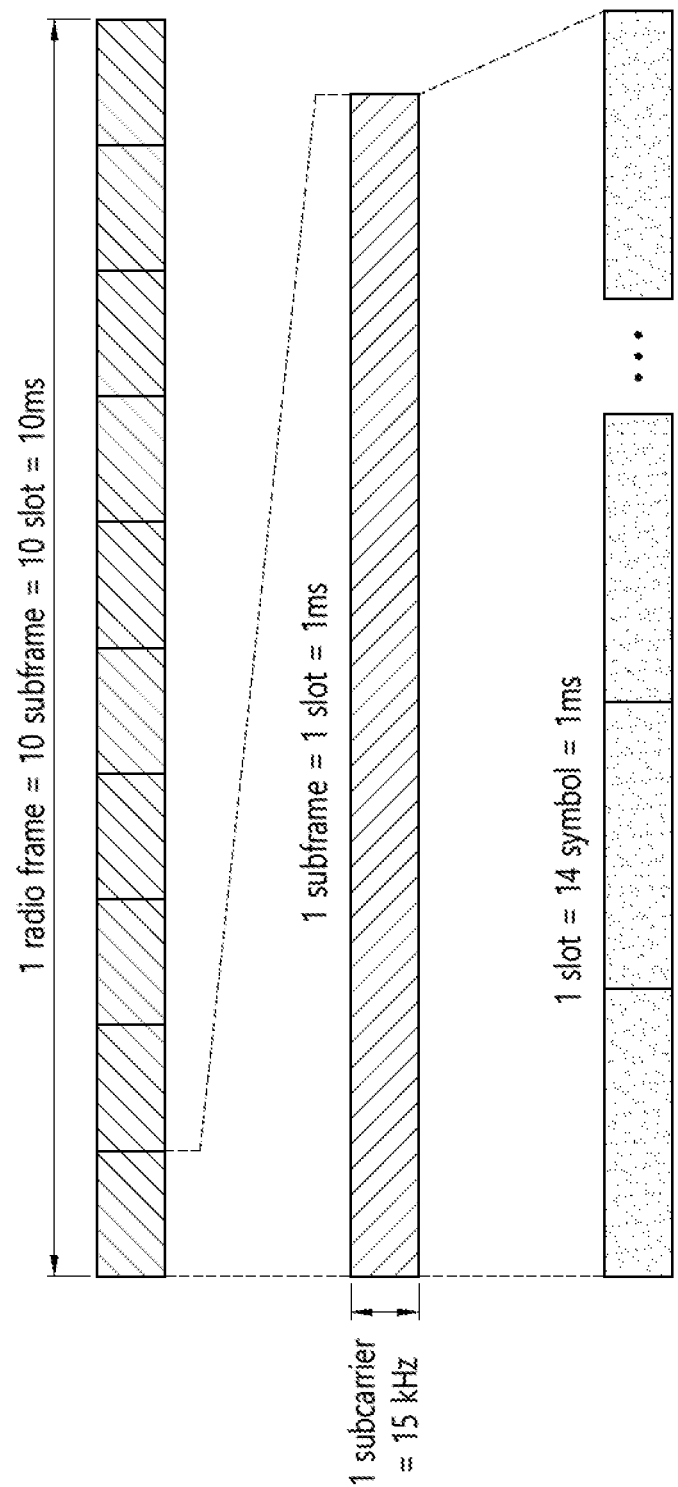
FIG. 3 shows an example of application of a particular numerology.

FIG. 3 shows an example of application of a particular numerology. That is, FIG. 3 shows a case in which $\mu$=0.

Figure 4:
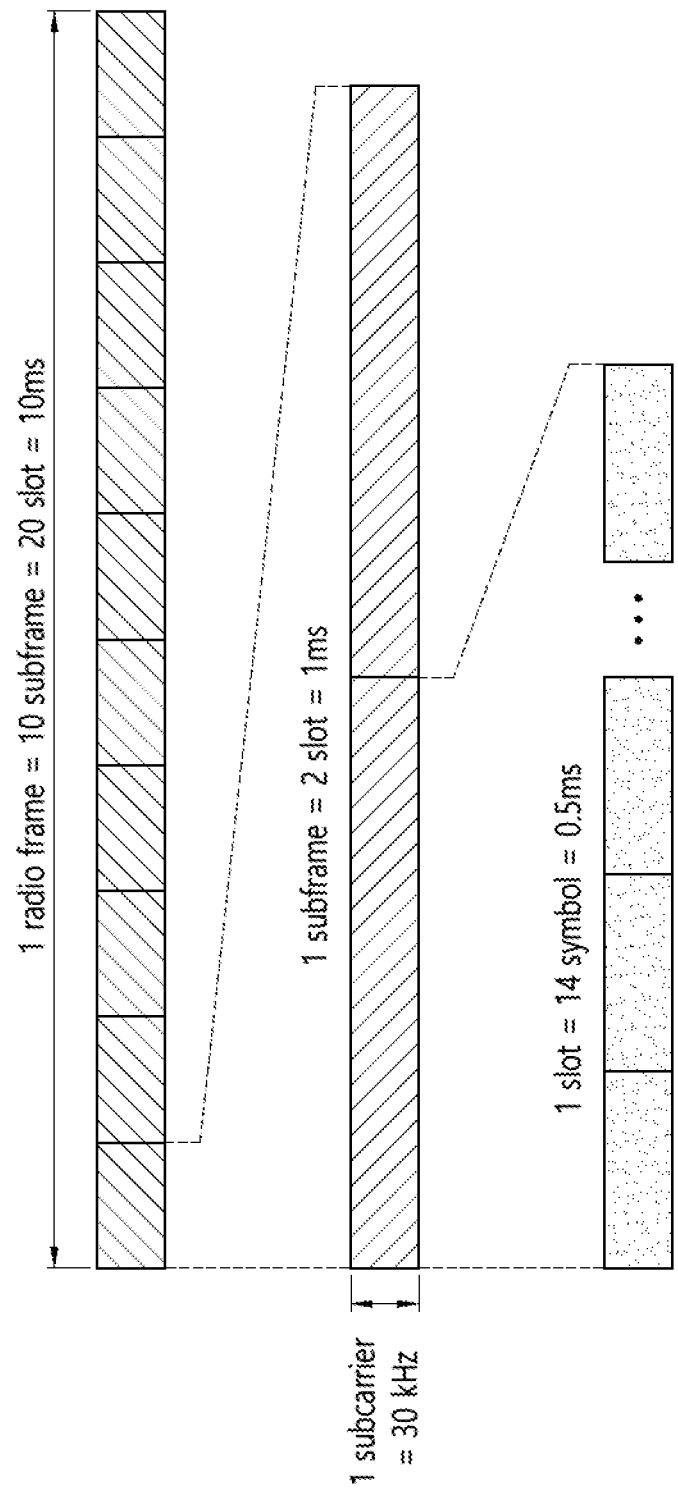
FIG. 4 shows an example of application of another numerology.

FIG. 4 shows an example of application of another numerology. That is, FIG. 4 shows a case in which $\mu$=1.

In the example in Table 2, a normal cyclic prefix (CP) may be applied. If an extended CP is applied, the numerology in the following Table 3 may be used.

TABLE 3

| $\mu$ | Number of symbols in a slot | Number of slots in a radio frame | Number of slots in a subframe |
|---|---|---|---|
| 2 | 12 | 40 | 4 |

Meanwhile, Frequency Division Duplex (FDD) and/or Time Division Duplex (TDD) may be used in a wireless system in which an example of the present embodiment is applied. For TDD, in LTE systems, uplink and downlink subframes are allocated in subframes.

In NR standards/systems, each symbol may be distinguished by downlink (denoted by D), flexible (denoted by X), or uplink (denoted by U) as in the following table. The following table may be applied commonly to specific cells or adjacent cells or applied individually or differently to each UE.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |

TABLE 4-continued

| Format | \multicolumn{14}{c}{Symbol number in a slot} | | | | | | | | | | | | | |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |

For convenience of explanation, Table 4 shows only some of the formats actually defined in the NR standards, and a specific allocation technique may be changed or added.

The UE may be assigned a slot format through a higher layer signal, based on Downlink Control Information (DCI) sent via Physical Downlink Control Channel (PDCCH), or based on a combination of a higher layer signal (i.e., RRC signal) and the DCI.

Figure 5:
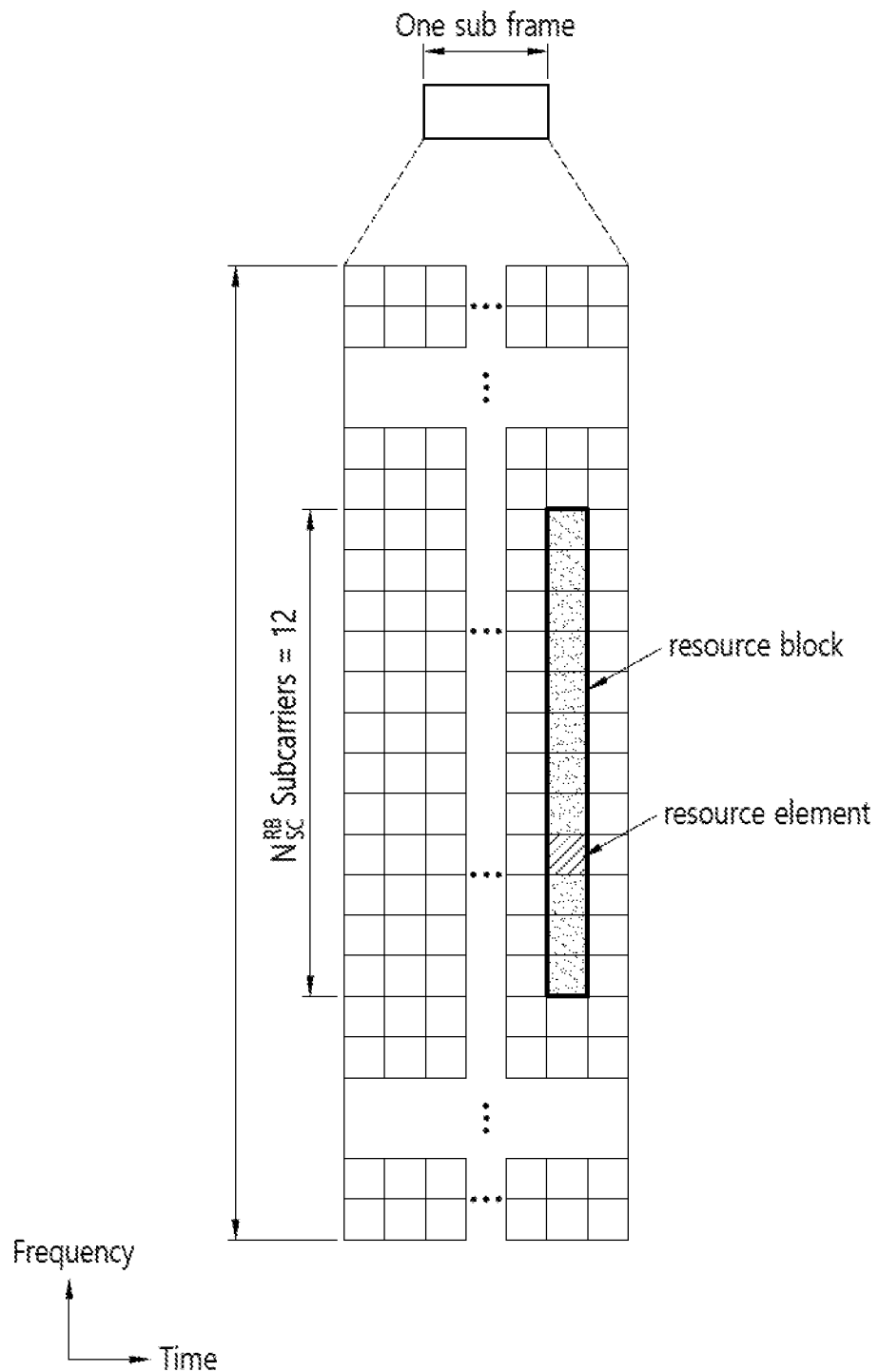
FIG. 5 is a view showing an example of a resource grid.

FIG. 5 is a view showing an example of a resource grid. The example in FIG. 5 shows a time-frequency resource grid used in the NR standards. The example in FIG. 5 may be applied in uplink and/or downlink. As shown in the drawing, one subframe includes a plurality of slots on the time axis. Specifically, "14·2µ" symbols may be represented within the resource grid based on the µ value. Also, as shown in the drawing, one resource block (RB) may occupy 12 contiguous subcarriers. One resource block may be referred to as a physical resource block (PRB), and each physical resource block may include 12 resource elements (RE). The number of resource blocks RB that can be allocated may be determined based on the smallest value and the largest value. Moreover, the number of resource blocks RB that can be allocated may be set individually according to the numerology "µ.". It may have the same value or different values for uplink and downlink.

A cell search technique conducted in the NR standards will be described below. The UE may perform a cell search in order to acquire time and/or frequency synchronization with a cell and acquire the identifier (cell ID) of the cell. For the cell search, synchronous channels such as Primary Synchronization Signal (PSS), Secondary Synchronization Signal (SSS), and Physical Broadcast Channel (PBCH) may be used.

The protocol structure between network entities is described below.

Figure 6:
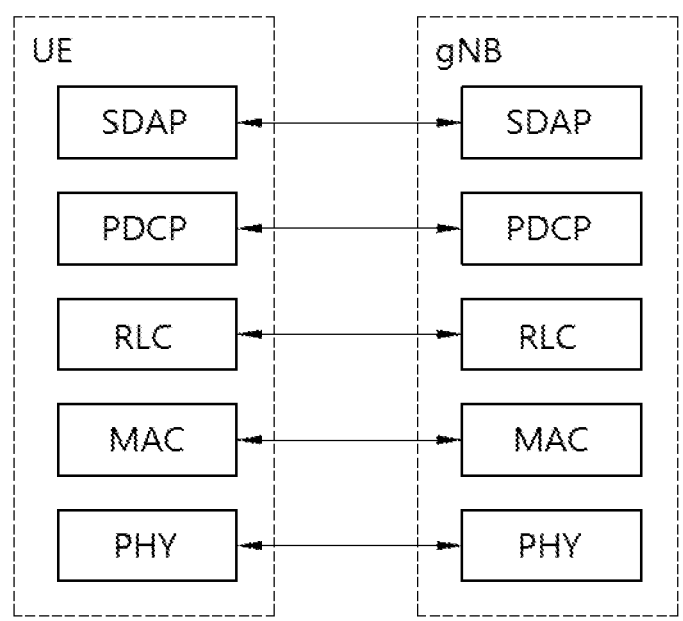
FIG. 6 is a diagram showing a wireless protocol architecture for a user plane.
Figure 7:
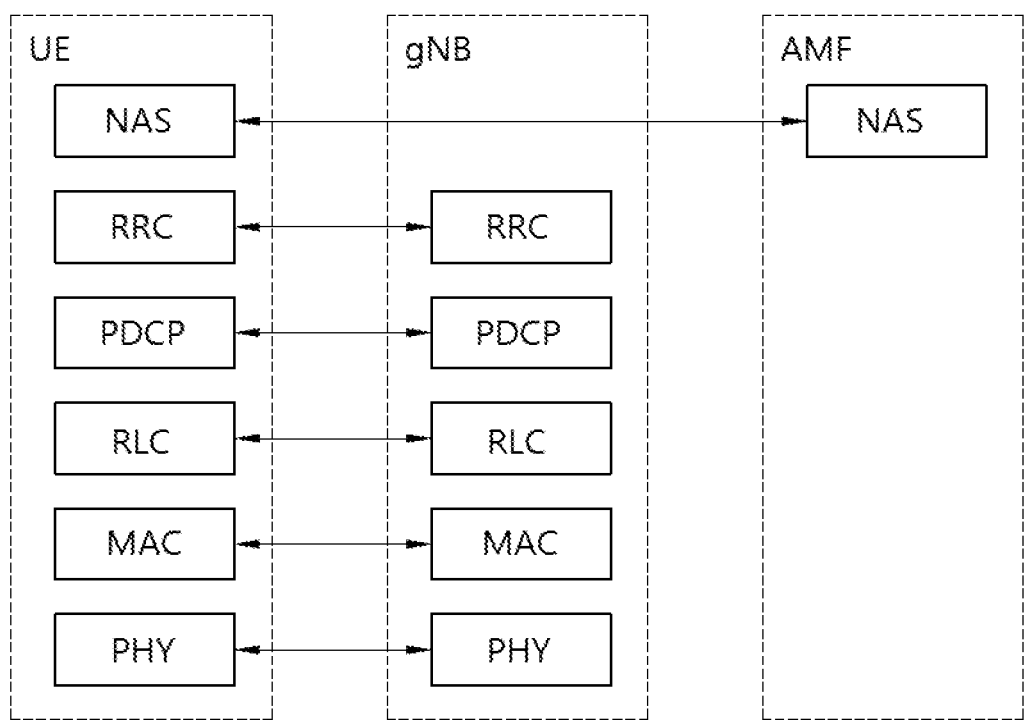
FIG. 7 is a diagram showing a wireless protocol architecture for a control plane.

FIG. 6 is a diagram showing a wireless protocol architecture for a user plane. FIG. 7 is a diagram showing a wireless protocol architecture for a control plane. The user plane is a protocol stack for user data transmission. The control plane is a protocol stack for control signal transmission.

Referring to FIGS. 6 and 7, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The function of a Packet Data Convergence Protocol (PDCP) layer on the user plane includes the transfer of user data and header compression and ciphering. The function of the PDCP layer on the user plane further includes the transfer and encryption/integrity protection of control plane data.

A Service Data Protocol (SDAP) in the user plane performs mapping between a QoS flow and a Data Radio Bearer (DRB).

A radio resource control (RRC) layer is defined only in the control plane. The RRC layer serves to control the logical channel, the transport channel, and the physical channel in association with configuration, re-configuration and release of radio bearers (RBs). A radio bearer RB is a logical path provided by the first layer (i.e., the PHY layer) and the second layer (i.e., the MAC layer, the RLC layer, and the PDCP layer) for data delivery between the UE and the network.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

Regarding the RRC layer, in the LTE standards, when an RRC connection is established between an RRC layer of the UE and an RRC layer of the E-UTRAN, the UE is in an RRC-connected state, and otherwise the UE is in an RRC idle state. In the NR standards, an RRC-inactive state was additionally introduced. The RRC-inactive state may be used for various purposes. For example, an mMTC (massive machine type communications) UE may be used by efficiently managing it. When a specific condition is met, a transition from one of the aforementioned three states to another state is made.

A preset operation may be performed depending on the RRC state. For example, in the RRC idle state and RRC-inactive state, system information (SI) may be broadcasted, and mobility may be supported based on cell re-selection which is managed by the UE. It should be noted that, in the RRC idle state, the 5G core network (5GC) explained in FIG. 2, etc. may manage paging for the UE and support a discontinuous reception (DRX) operation for 5GC paging, whereas, in the RRC-inactive state, the NG-RAN explained in FIG. 2, etc. may manage paging for the UE and support DRX operation for NG-RAN paging. Meanwhile, in both the RRC-inactive state and the RRC-connected state, the user plane and the control plane may be both established between the NG-RAN and the UE. In the RRC-connected state, mobility managed by the network may be supported, and uplink/downlink unicast data for the UE may be processed.

A downlink transport channel through which data is transmitted from a network to UE includes a broadcast channel (BCH) through which system information is transmitted and a downlink shared channel (SCH) through which user traffic or control messages are transmitted. Also, a PCH (paging channel) for paging is defined. Meanwhile, an uplink transport channel through which data is transmitted from UE to a network includes a random access channel (RACH) through which an initial control message is transmitted and an uplink shared channel (SCH) through which user traffic or control messages are transmitted.

Logical channels, which are located above the transport channels and are mapped to the transport channels, include a Broadcast Control Channel (BCCH), a Paging Control Channel (PCCH), a Common Control Channel (CCCH), a Dedicated Traffic Channel (DTCH), etc.

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A transmission time interval (TTI) is a basic time unit the scheduler uses for resource allocation, which may be defined for one slot or a plurality of slots or defined for each mini-slot.

A Non-Access Stratum (NAS) layer placed over the RRC layer performs functions, such as session management and mobility management.

Now, the D2D operation will be described. In 3GPP LTE-A, the service related to D2D operation is called proximity based service (ProSe). Hereinafter, ProSe is equivalent to D2D operation and ProSe may be interchanged with D2D operation.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery. The link used for a D2D operation is referred to as sidelink in LTE.

Now, a vehicle to everything (V2X) communication is described. The V2X means a communication between a UE installed on a vehicle and another UE, and another UE may correspond to a pedestrian, a vehicle or an infrastructure. In this case, these may be referred to as a vehicle to pedestrian (V2P), a vehicle to vehicle (V2V) and a vehicle to infrastructure (V2I), respectively.

The V2X communication transmits/receives data/control information through sidelink defined in a D2D operation, not through uplink/downlink between an eNB and a UE, which is used in the conventional LTE communication.

The following physical channels may be defined in sidelink as below.

Physical Sidelink Broadcast CHannel (PSBCH) is a physical sidelink broadcast channel. Physical Sidelink Control CHannel (PSCCH) is a physical sidelink control channel. Physical Sidelink Discovery CHannel is a physical sidelink discovery channel. Physical Sidelink Shared CHannel is a physical sidelink shared channel. Sidelink Synchronization Signal (SLSS) is a sidelink synchronization signal. The SLSS may include Primary Sidelink Synchronization Signal (PSSS) and Secondary Sidelink Synchronization Signal (SSSS). The SLSS and the PSBCH may be transmitted together.

The sidelink may mean an interface between a UE and a UE, and the sidelink may correspond to PC5 interface.

Figure 8:
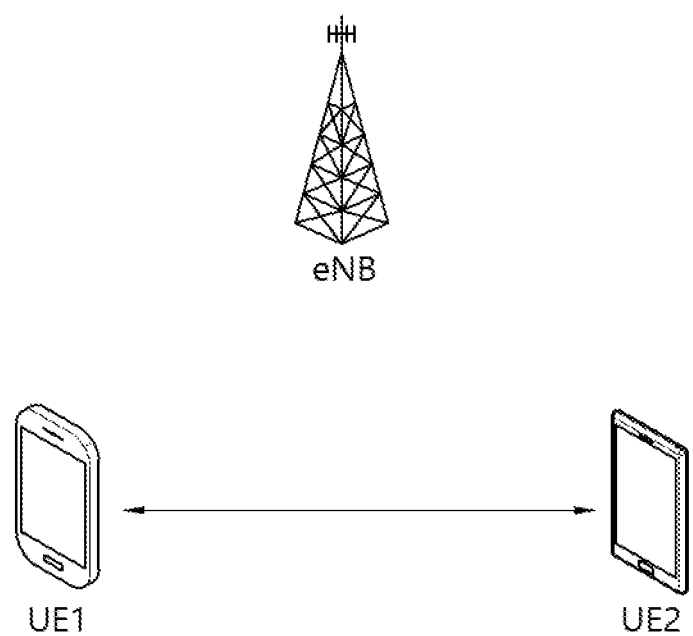
FIG. 8 illustrates terminals performing V2X or D2D communication.

FIG. 8 illustrates terminals performing V2X or D2D communication.

Referring to FIG. 8, in V2X/D2D communication, the term "UE" mainly refers to a user's terminal. However, when a network equipment such as a base station (eNB) transmits and receives a signal according to a communication method between terminals, it may also be regarded as a terminal.

UE 1 may select a resource unit corresponding to a specific resource within a resource pool representing a set of resources and transmit a V2X/D2D signal using the corresponding resource unit. UE 2 corresponding to a receiving UE may be configured with a resource pool in which UE 1 can transmit a signal, and detect the signal of UE 1 within the corresponding resource pool.

Here, the resource pool may be signaled by a base station when UE1 is within the coverage of the base station. When UE1 is located outside the coverage of the base station, the resource pool may be signaled by another UE or determined as predetermined resources.

In general, a resource pool consists of a plurality of resource units, and each UE may select one or a plurality of resource units and use the selected resource unit(s) to transmit its D2D signal.

Figure 9:
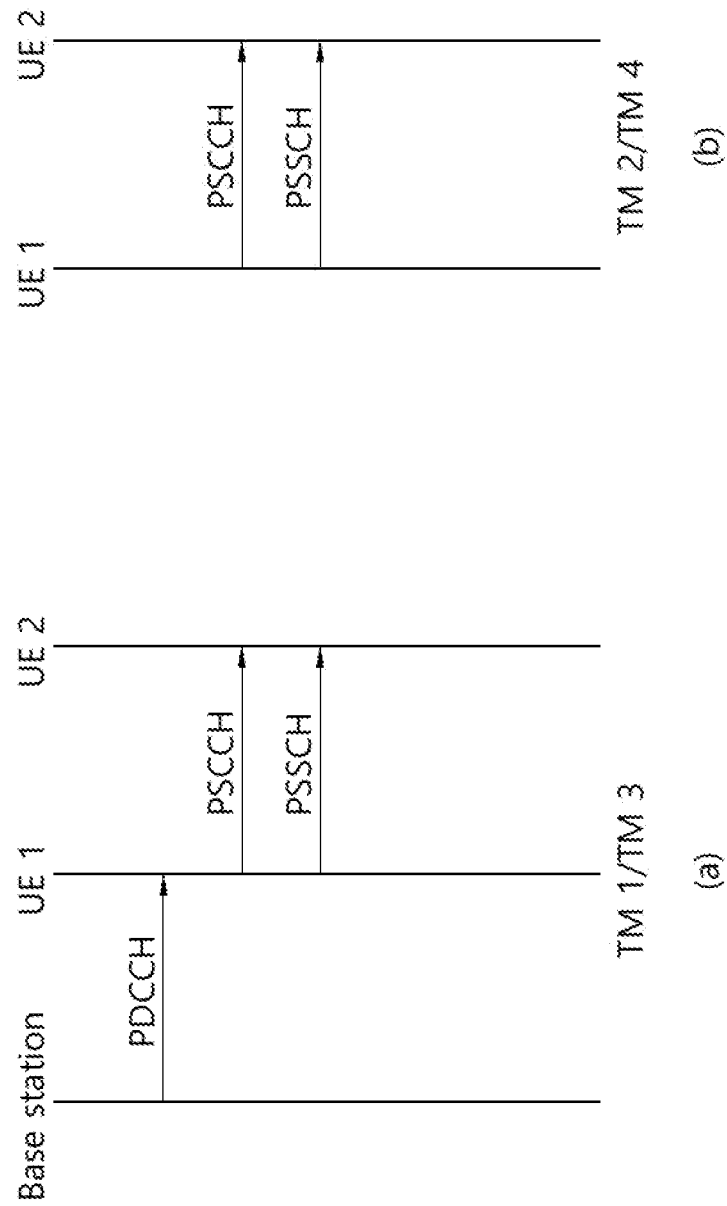
FIG. 9 illustrates how UE operates according to transmission modes (TM) related to V2X/D2D.

FIG. 9 illustrates how UE operates according to transmission modes (TM) related to V2X/D2D.

(a) of FIG. 9 is about transmission modes 1 and 3, and (b) of FIG. 9 is about transmission modes 2 and 4. In the transmission modes 1 and 3, the base station performs resource scheduling on UE 1 through PDCCH (more specifically, DCI), and UE 1 performs D2D/V2X communication with UE 2 according to the corresponding resource scheduling. UE 1 may transmit SCI (sidelink control information) to UE 2 through a PSCCH (physical sidelink control channel), and then transmit data based on the SCI through a PSSCH (physical sidelink shared channel). The transmission mode 1 may be applied to D2D, and the transmission mode 3 may be applied to V2X.

The transmission modes 2 and 3 are modes in which UE performs scheduling itself. More specifically, the transmission mode 2 is applied to D2D, and the UE may select resources itself within a configured resource pool and perform D2D operation. In the transmission mode 4, which is applied to V2X, the UE may select resources itself within a selection window through sensing/SA decoding processes and then perform V2X operation. UE 1 may transmit SCI through PSCCH and then transmit data based on the SCI through PSSCH. Hereinafter, the transmission modes will be abbreviated as modes.

While control information transmitted from a base station to a UE through the PDCCH is referred to as downlink control information (DCI), whereas control information transmitted from a UE to another UE through the PSCCH may be referred to as SCI. SCI may carry sidelink scheduling information. There may be various formats in SCI, for example, SCI format 0 and SCI format 1.

SCI format 0 may be used for scheduling of PSSCH. In SCI format 0, a frequency hopping flag (1 bit), resource block allocation and hopping resource allocation fields (the number of bits may vary depending on the number of resource blocks in the sidelink), a time resource pattern (7 bits), MCS (modulation and coding scheme, 5 bits), a time advance indication (11 bits), a group destination ID (8 bits), and the like.

SCI format 1 may be used for scheduling of PSSCH. In SCI format 1, priority (3 bits), resource reservation (4 bits), frequency resource position of initial transmission and retransmission (the number of bits may vary depending on the number of subchannels in the sidelink), time gap between initial transmission and retransmission (4 bits), MCS (5 bits), retransmission index (1 bit), reserved information bits, and the like. The reserved information bits may be abbreviated as reserved bits below. The reserved bits can be added until the bit size of SCI format 1 reaches 32 bits. That is, SCI format 1 includes a plurality of fields including different information, and the remaining number of bits except the total number of bits of the plurality of fields, out of the fixed total number of bits (32 bits) of the SCI format 1, may be referred to reserved bits.

SCI format 0 may be used for the transmission modes 1 and 2, and SCI format 1 may be used for the transmission modes 3 and 4.

Figure 10:
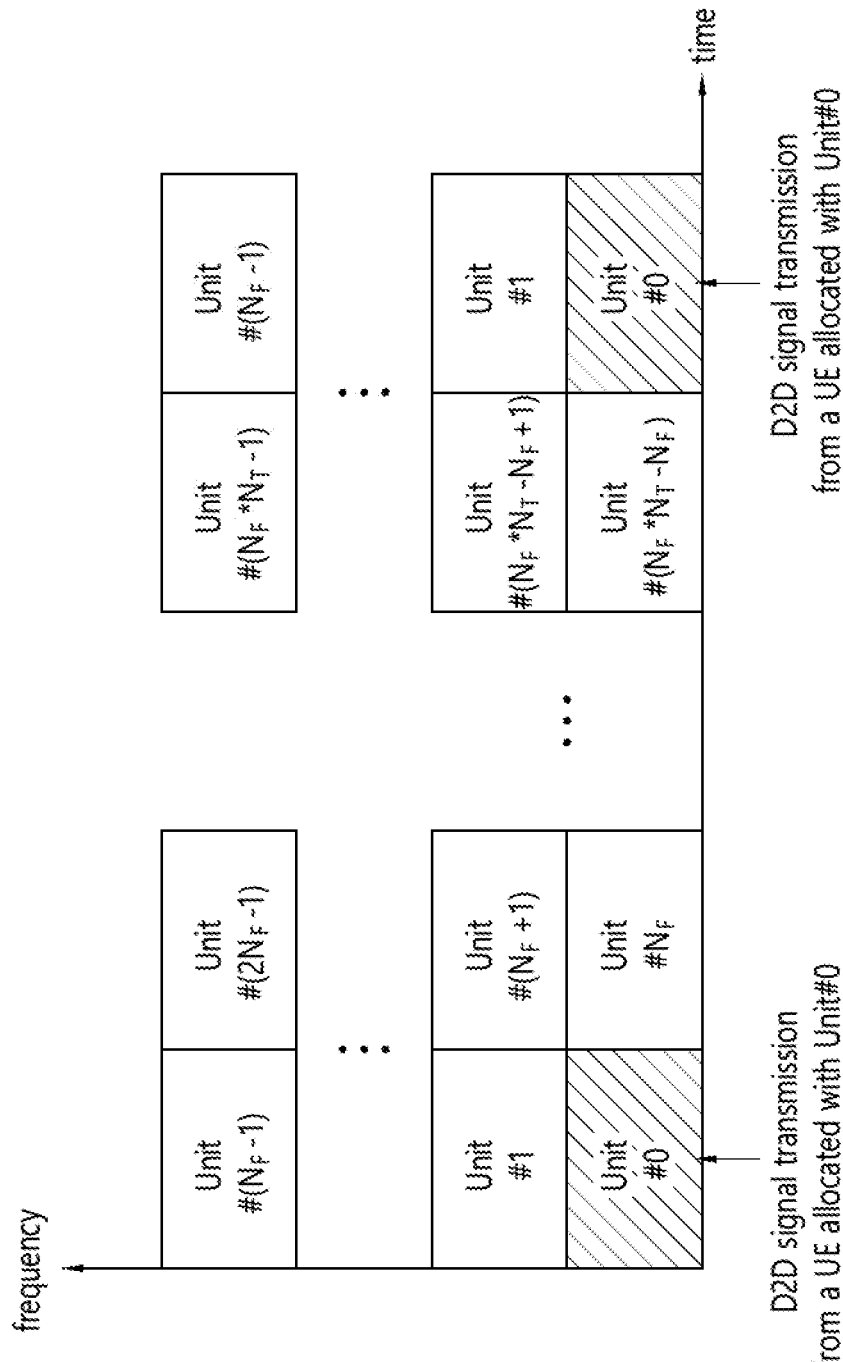
FIG. 10 shows an example of configuration of resource units.

FIG. 10 shows an example of configuration of resource units.

Referring to FIG. 10, all of the frequency resources in the resource pool may be divided into $N_F$, and the all of the time resources in the resource pool may be divided into $N_T$, by which a total of $N_F*N_T$ resource units may be defined.

Here illustrated is a case in which the corresponding resource pool repeats for every $N_T$ subframes.

As shown in FIG. 10, one resource unit (e.g., Unit#0) may repeat periodically. Alternatively, in order to obtain a diversity effect in the time or frequency domain, the index of a physical resource unit to which one logical resource unit is mapped may change with time in a predetermined pattern. In such a resource unit structure, a resource pool may refer to a set of resource units a UE wanting to transmit a D2D signal can use for transmission.

The resource pool can be classified into various types. For example, the resource pool can be classified according to the content of a D2D signal transmitted from the resource pool. Each resource pool may be classified as follows, and the content of a D2D signal may be transmitted in each resource pool as follows.

1) Scheduling assignment (SA) resource pool or D2D (sidelink) control channel: A resource pool in which each transmitting UE transmits a signal including the position of a resource for a D2D data channel transmitted in a subsequent or same subframe and other information (e.g., modulation and coding scheme (MCS) or MIMO transmission scheme, timing advance, etc.) required for demodulation of the data channel.

The signal explained in 1) may be multiplexed and transmitted on the same resource unit, together with D2D data. In this case, a SA resource pool may refer to a resource pool in which SA is multiplexed and transmitted together with D2D data.

2) D2D data channel: A resource pool used by a transmitting UE to transmit user data using resources designated through an SA. If SA information and D2D data are multiplexed and transmitted together on the same resource unit, only a D2D data channel except SA information can be transmitted in a resource pool for the D2D data channel. In other word, resource elements (REs), which are used to transmit SA information on each individual resource unit of an SA resource pool, also can be used for transmitting D2D data in a D2D data channel resource pool.

3) Discovery channel: A resource pool for a message in which a transmitting UE transmits its ID (identity), etc. to enable a neighboring UE to find the transmitting UE.

Although the content of the above-explained D2D signal is the same, different resource pools may be used depending on the transmission/reception attributes of the D2D signal. In an example, different resource pools may be used even for the same D2D data channel or discovery message, depending on the method of determining the transmission timing of the D2D signal (e.g., whether the D2D signal is transmitted at the time of receipt of a synchronization reference signal or transmitted using a given timing advance at the time of receipt), the method of resource allocation (e.g., whether a base station designates each signal transmission resources for each individual transmitting UE or each individual transmitting UE selects each signal transmission resources on its own within a resource pool), the signal format (e.g., the number of symbols each D2D signal occupies in a subframe or the number of subframes used to transmit one D2D signal), the strength of signal from the base station, and the strength of transmitted power of a D2D UE.

As described previously, a method in which the base station itself indicates transmission resources for a D2D transmitting UE in D2D communication may be referred to as Mode 1, and a method in which a transmission resource region is preset or the base station designates a transmission resource region and the UE itself selects transmission resources may be referred to as Mode 2.

In the case of D2D discovery, if the base station itself indicates resources, this may be called Type 2, and if the UE itself selects transmission resources, this may be called Type 1.

Meanwhile, the D2D also may be called sidelink. SA also may be referred to as a physical sidelink control channel (PSCCH), and a D2D synchronization signal also may be referred to as a sidelink synchronization signal (SSS). A control channel that transmits the most basic information prior to D2D communication is referred to as a physical sidelink broadcast channel (PSBCH), and the PSBCH may be transmitted together with the SSS or may be called by a different name, a PD2DSCH (physical D2D synchronization channel). A signal for a specific UE to indicate that it is in the vicinity may include the ID of the specific UE. A channel through which such a signal is transmitted may be called a physical sidelink discovery channel (PSDCH).

In D2D, only a D2D communication UE transmits the PSBCH together with the SSS, and due to this, the measurement of the SSS is performed using the DM-RS (demodulation reference signal) of the PSBCH. An out-coverage UE may measure the DM-RS of the PSBCH and measure the RSRP (reference signal received power) of this signal to determine whether the UE itself can be a synchronization source or not.

Figure 11:
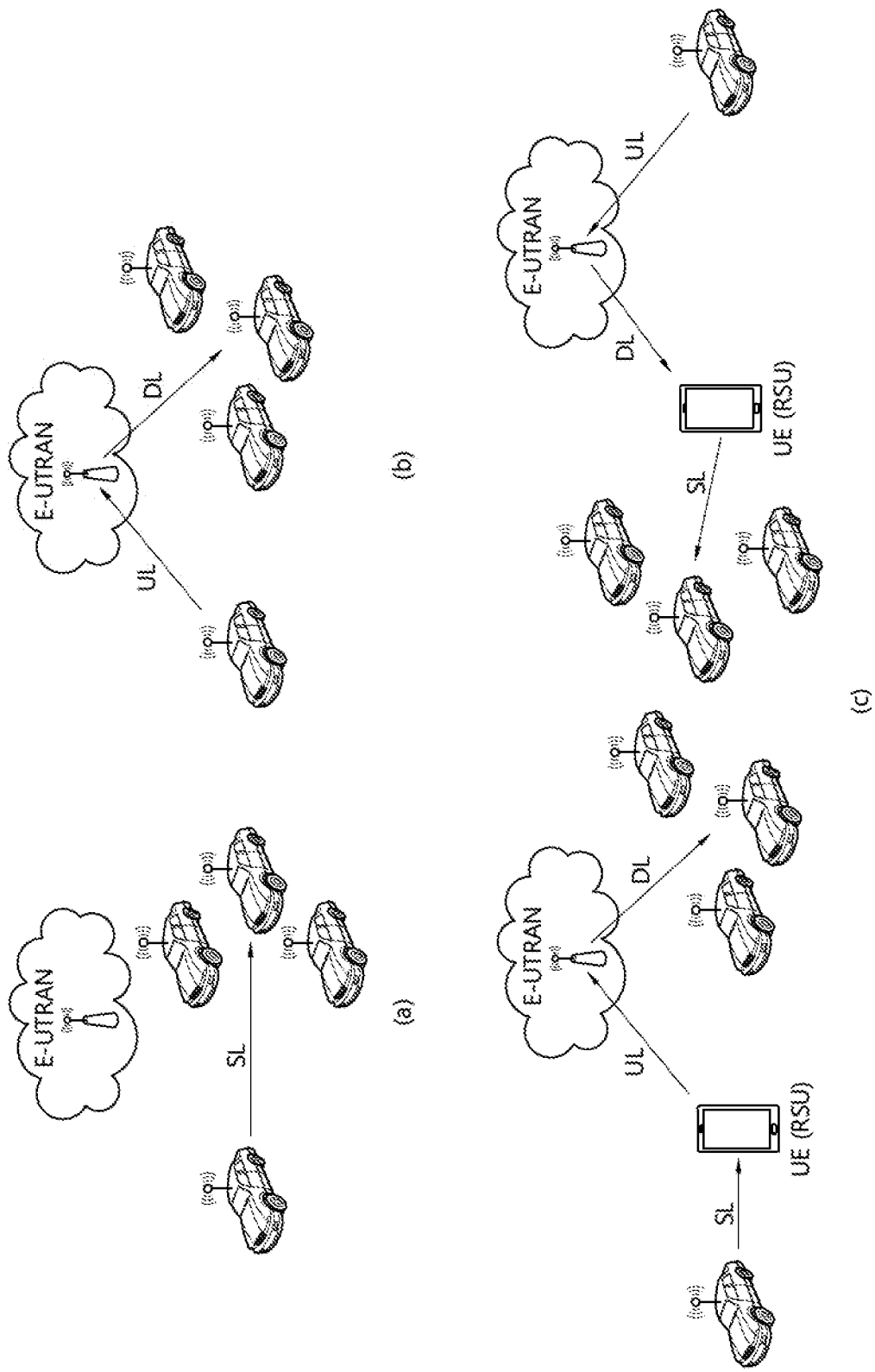
FIG. 11 illustrates scenarios for V2X communication.

FIG. 11 illustrates scenarios for V2X communication.

Referring to FIG. (a) of FIG. 11, V2X communication may support information exchange operation (between UEs) of PC5-based (side link), which is an interface between UEs, and, as shown in (b) of FIG. 11, may support a Uu-based information exchange operation (between UEs), which is an interface between an eNodeB and a UE. In addition, as shown in FIG. (c) of FIG. 11, both PC5 and Uu may be used to support information exchange operations (between UEs).

Now, the present disclosure will be described.

The present disclosure may relate to a method of deciding whether to perform feedback (ACK/NACK feedback) when applying HARQ operation to V2X communication. For example, the present disclosure relates to a method of deciding on feedback depending on the status of a receiving end in order to avoid unnecessary feedback, in a case where a transmitting end performs initial transmission and then a receiving end gives feedback by determining the reliability of the initial transmission (for example, ACK/NACK transmission for the initial transmission). Although the present disclosure is appropriate for V2X (for example, (a) of FIG. 11) with a scenario without no control of resources from the base station, its application in other scenarios is not excluded.

In the current LTE, HARQ operation and feedback operation for improving reliability in V2X communication are not used (that is, a data receiving UE's operation of giving feedback of ACK/NACK). However, eV2X (enhanced V2X), which is used in a future wireless communication system, may require higher reliability, and HARQ operation may not be excluded in eV2X. That is, eV2X may employ HARQ operation.

As compared to the method of repeatedly transmitting data while not knowing whether a receiving UE has properly received data or not, a method of performing retransmission only when it is indicated through HARQ feedback that the receiving UE has not properly received data may have several advantages. For example, when the channel status is good, most UEs may be able to send and receive only by initial transmission. In this situation, employing the method of retransmission through HARQ feedback will offer a big advantage in terms of resource utilization (that is, half-duplex mitigation and low congestion). Also, the reduced number of retransmissions may lower interference from a number of transmitting UEs from the point of view of the receiving UE.

For this reason, in a case where eV2X employs HARQ operation which is becoming increasingly necessary, resource allocation for HARQ feedback may be required. In this case, in order to increase resource utilization, it will be better not to give feedback in an environment in which no HARQ feedback is necessary (for example, when the HARQ feedback transmitted by a receiving UE is deemed hard to receive properly because the RSRP/RSRQ measured by receiving UEs is low on the whole).

In an example, if the RSRP/RSRQ measured by a transmitting UE (or receiving UE) is lower than a specific reference, or the RSRP is becoming lower and lower, resources can be used more effectively if NACK transmission is not induced.

The present disclosure proposes a method of deciding on feedback (e.g., ACK/NACK transmission) based on information (e.g., RSRP, RSRQ, positioning information, feedback threshold) that is obtained at a specific time (or period) or varies with time or a method of making a decision about the status of feedback (e.g., whether the feedback is reliable) or the type of feedback (for example, ACK/NACK, CQI, etc.).

Figure 12:
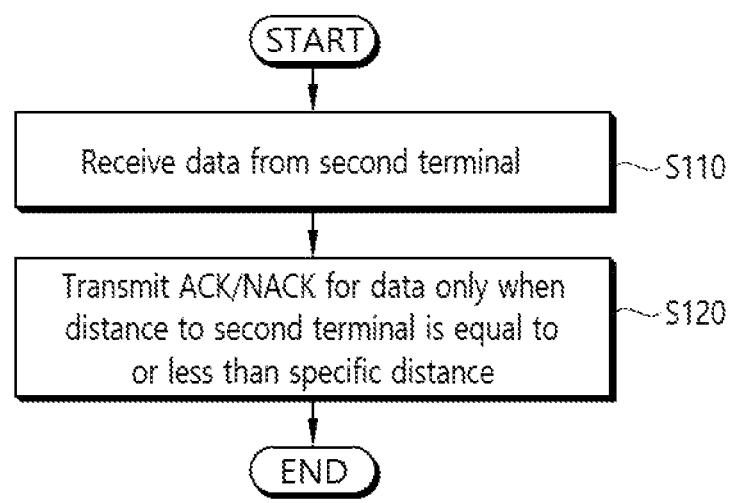
FIG. 12 illustrates a method for operating a terminal for V2X communication according to an exemplary embodiment of the present disclosure.

FIG. 12 illustrates a method for operating a terminal for V2X communication according to an exemplary embodiment of the present disclosure.

Referring to FIG. 12, a terminal (to be referred to as a first terminal for convenience) receives data from a second terminal (S110), and may transmit acknowledgement/negative-acknowledgement (ACK/NACK) for the data only when the distance to the second terminal is equal to or less than a specific value (S120).

Here, the distance between the second terminal (transmitting UE) and the first terminal (receiving UE) may be defined according to the following criteria.

1. Actual distance (i.e., geographic distance). For example, the geographic location of a terminal, terminal's location based on GNSS (global navigation satellite system).

2. Radio distance. For example, a receiving UE may measure RSRP (reference signal received power), RSRQ (reference signal received quality), etc. using a reference signal transmitted by a transmitting UE. Based on the RSRP/RSRP, the distance between the transmitting UE and the receiving UE may be determined. For example, if the RSRP or RSRQ is greater than a threshold, it is determined that the distance to the second terminal is equal to or less(smaller) than a specific value, and, if the RSRP or RSRQ is equal to or less than the threshold, it is determined that the distance to the second terminal is greater than the specific value. If the RSRP or RSRQ is equal to or less than the threshold, no ACK/NACK for the data may be transmitted.

In a case where the distance between terminals is determined based on the radio distance, if the measured RSRP/RSRP is low because the channel status between the terminals A and B is poor, even though the terminals A and B are located geographically close to each other, the terminals A and B may be deemed located far from each other. On the contrary, if the measured RSRP/RSRP is high because the channel status between the terminals A and B is good, even though the terminals A and B are located geographically far from each other, the terminals A and B may be deemed located close to each other.

The above-described measurement of actual distance (which means geographic distance hereinafter) may be done, for example, as follows. First of all, a first message (e.g., CAM/BSM) containing each vehicle's location information (e.g., coordinates or GNSS information) may be transmitted for basic service, and a second message containing sensing information or driving intention information may be additionally transmitted. The driving intention information may be information that indicates the intention of driving such as changing to the left/right lane and turning left/right. In this instance, the first message (location information) may be transmitted with a relatively long cycle, or may be transmitted at a low channel coding rate. Using this method, the receiving side is able to receive the first message easily even if it receives only the initial transmission.

Also, the second message (sensing/driving intention information) may be transmitted with a relatively short cycle, or may be transmitted at a high channel coding rate, or HARQ operation may apply only to the second message. In this case, if it is possible to know which vehicle has transmitted by setting the source ID to be the same as the ID in the first message or partially the same in the scheduling assignment (SA) for the second message, the distance may be measured based on the coordinates contained in the first message and the coordinates of the receiving side.

If HARQ applies to the second message, it is possible to decide on HARQ feedback by deciding whether the current receiving end is within a preset target range of the corresponding message based on the distance calculated based on service type or destination in the scheduling assignment for the second message.

Moreover, in an example, although the first and second messages are not transmitted separately but together (for example, combined into one codeword), HARQ transmission may apply to the two messages while each message has different channel coding rates, with the location information having a lower coding rate. Likewise, whether the receiving end gives feedback or not may be decided based on the actual distance calculated according to the location information and the preset target range shown in the scheduling assignment.

Figure 13:
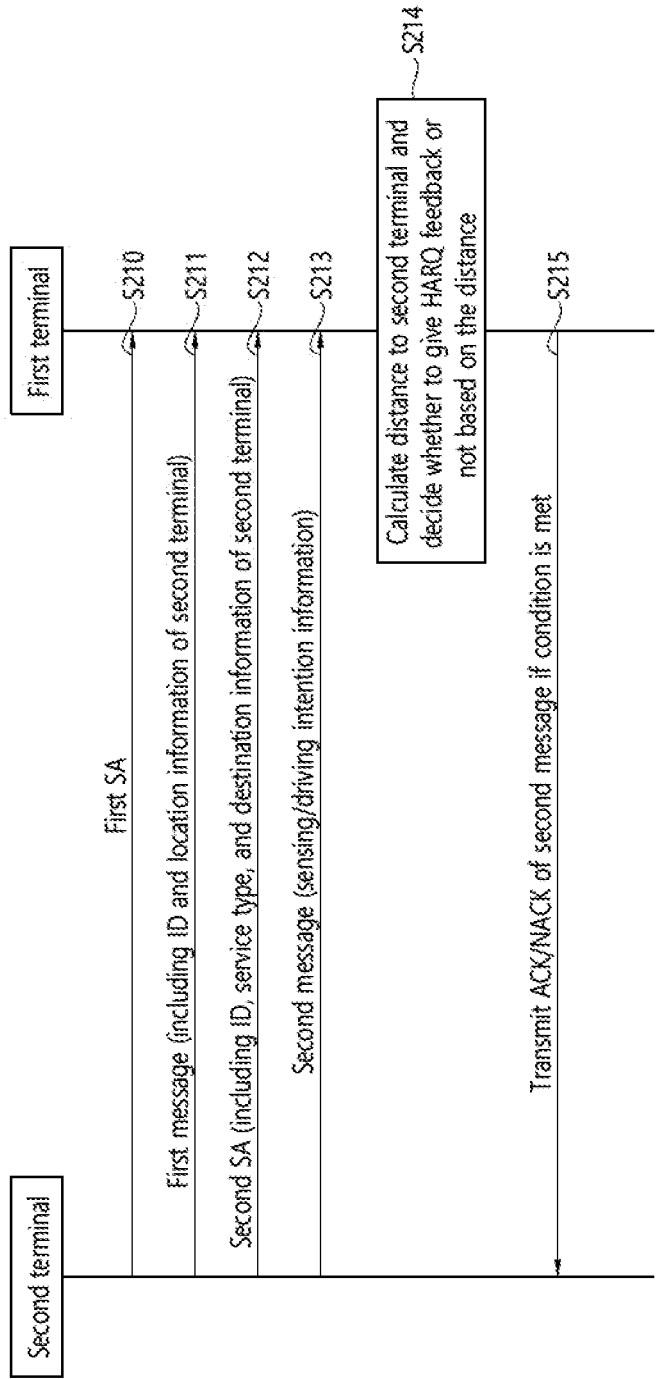
FIG. 13 shows an example in which the method of FIG. 12 is specifically applied between terminals performing V2X communication.

FIG. 13 shows an example in which the method of FIG. 12 is specifically applied between terminals performing V2X communication.

Referring to FIG. 13, a first terminal and a second terminal may be terminals participating in V2X communication.

The second terminal transmits first scheduling assignment (SA) information to the first terminal (S210).

The second terminal transmits a first message scheduled by the first SA information to the first terminal (S211). The first message is a message transmitted for basic service, and may include the ID and location information of the second terminal (for example, coordinates or GNSS information). The first message may be set in such a way that ACK/NACK feedback is not given all the time.

The second terminal transmits a second SA to the first terminal (S212). The second SA may include the ID, service type, destination information, etc. of the second terminal. The ID of the second terminal included in the second SA is the same as the ID of the second terminal included in the first message or at least partially the same, thus enabling the first terminal to know that the second terminal has transmitted the first message.

The second terminal transmits a second message scheduled by the second SA to the first terminal (S213). The second message may include sensing information or driving intention information. The second message may be a message that is transmitted more frequently than the first message.

The first terminal calculates the distance to the second terminal and decides whether to give HARQ feedback or not based on the distance (S214). For example, the first terminal may calculate the distance to the second terminal based on the location information of the second terminal included in the first message and its own location information. Also, whether to give HARQ feedback or not may be decided by comparing the distance with a preset or signaled threshold.

If a specific condition is met, the first terminal transmits ACK/NACK for the second message to the second terminal (S215). For example, if the calculated distance to the second terminal is equal to or less than a preset or signaled threshold, ACK/NACK may be transmitted.

As the geographic or radio distance between terminals performing V2X communication becomes longer, a data transmitting UE may not be able to receive an ACK/NACK signal even if a data receiving UE transmits the ACK/NACK signal. In this case, transmitting ACK/NACK creates unnecessary interference with other terminals and is inefficient in terms of resource utilization. In view of this, in the present disclosure, whether to transmit ACK/NACK is decided depending on the geographic/radio distance between terminals performing V2X communication. Consequently, it is possible to support HARQ operation in V2X communication efficiently in terms of resource utilization, without creating any unnecessary interference with other terminals.

While the method proposed above has been described with an example in which a decision is made about HARQ feedback depending on whether a receiving UE is within a given distance from a source UE (e.g., transmitting UE), the present disclosure is not limited to this but may apply to message filtering (i.e., the message is not placed on the application layer).

Moreover, if the decoding capacity reaches a limit, for example, the distance between each transmitting UE of a multicast message and whether or not they are within a target range may be determined and used as criteria for determining which message to decode first. Also, they may be used as criteria for determining the channel status or quality such as CQI of LTE, or may be used as criteria for determining the status or quality of feedback (e.g., ACK/NACK).

Meanwhile, in the present disclosure, a decision may be made about the aforementioned feedback by using both the calculated actual distance (geographic distance) information and the radio distance (e.g., RSRP/RSRQ) between the two UEs. In an example, in a case where the receiving UE knows both the actual distance from the source UE and the RSRP/RSRQ, the RSRP/RSRQ relative to distance may be found out, and the change in RSRP/RSRQ relative to distance may be calculated and estimated through observation on the time axis or through averaging. Using this information, it is possible to make a decision about whether to give feedback or not and which type of feedback to give.

If a receiving UE receives a periodical message, the radio distance (RSRP/RSRQ) may be obtained by measuring the amplitude of a signal (e.g., DM-RS) received before a resource reselection occurs, or may be found out if a separate reference signal or signal for positioning/radio distance measurement is introduced. Also, the measurement of RSRP/RSRQ can be done through received control information (e.g., PSCCH).

The radio distance may be found out simply by channel estimation and power calculation using a reference signal (e.g., DM-RS) of a predefined control channel (e.g., PSCCH). Also, if decoding of PSCCH is successful, power may be estimated by estimating a string of decoded bits and regenerating a received signal using an estimated channel value.

The measured RSRP/RSRQ may be used as the radio distance at a specific point in time, or its change may be observed through a value calculated using a signal that is transmitted multiple times (e.g., through observation on the time axis or averaging).

The measurement of RSRP/RSRQ may apply separately for each transmitting UE, which may be done based on the ID of the transmitting UE or the location of a periodically reserved resource. If it is predicted through the measured RSRP/RSSQ that the future RSRP/RSRQ will be no more than a given value, no feedback message (e.g., ACK/NACK) may be transmitted. Through this, unnecessary HARQ retransmission may be avoided.

When viewed at a specific point in time, if the measured RSRP/RSRQ (or radio distance information linked to RSRP/RSRQ) is lower than a specific threshold, no feedback message may be transmitted.

Alternatively, from a different point of view, a feedback message may be reported only when the measured RSRP/RSRP is above a specific threshold. Here, the threshold may vary depending on the V2X service, the congestion level, or the target range of the service. The threshold may be signaled directly to a UE through higher layer signaling (e.g., RRC signaling), or may be signaled to a UE through a predefined channel (e.g., PSCH (more specifically, reserved bits of PSCH)).

In an example, in a case where the threshold varies depending on the service, a service targeted for a short range may be set to have a high threshold value, a service targeted for a long range may be set to have a low threshold value, and a service that requires no HARQ may be set to infinity (this may mean that the HARQ process will be ended).

In this way, the target range of a certain service may be signaled directly through a predefined channel (e.g., PSCCH), or services may be distinguished by resource pool or by carrier.

Also, in an example, in a case where the threshold varies depending on the congestion level, the number of UEs which may collide increases with increasing congestion level. Thus, the threshold may be increased to avoid additional collision caused by feedback. Additionally, if a specific service does not support HARQ operation, this may be implicitly applied to the threshold, or separate indication information may be signaled through a predefined channel.

Moreover, the signaled threshold may be linked to the priority of a service (or packet) and the source ID, or may signaled separately to help make a decision about feedback. Due to this, the receiving UE may decide about feedback based on the RSRP/RSRQ or after recognizing whether HARQ operation is performed depending on the service.

The measured RSRP/RSRQ may be analyzed extensively in the time domain. If the RSRP/RSRQ observed continuously in the past is predicted to decrease or increase from now on, no feedback may be reported at this current point in time.

Figure 14:
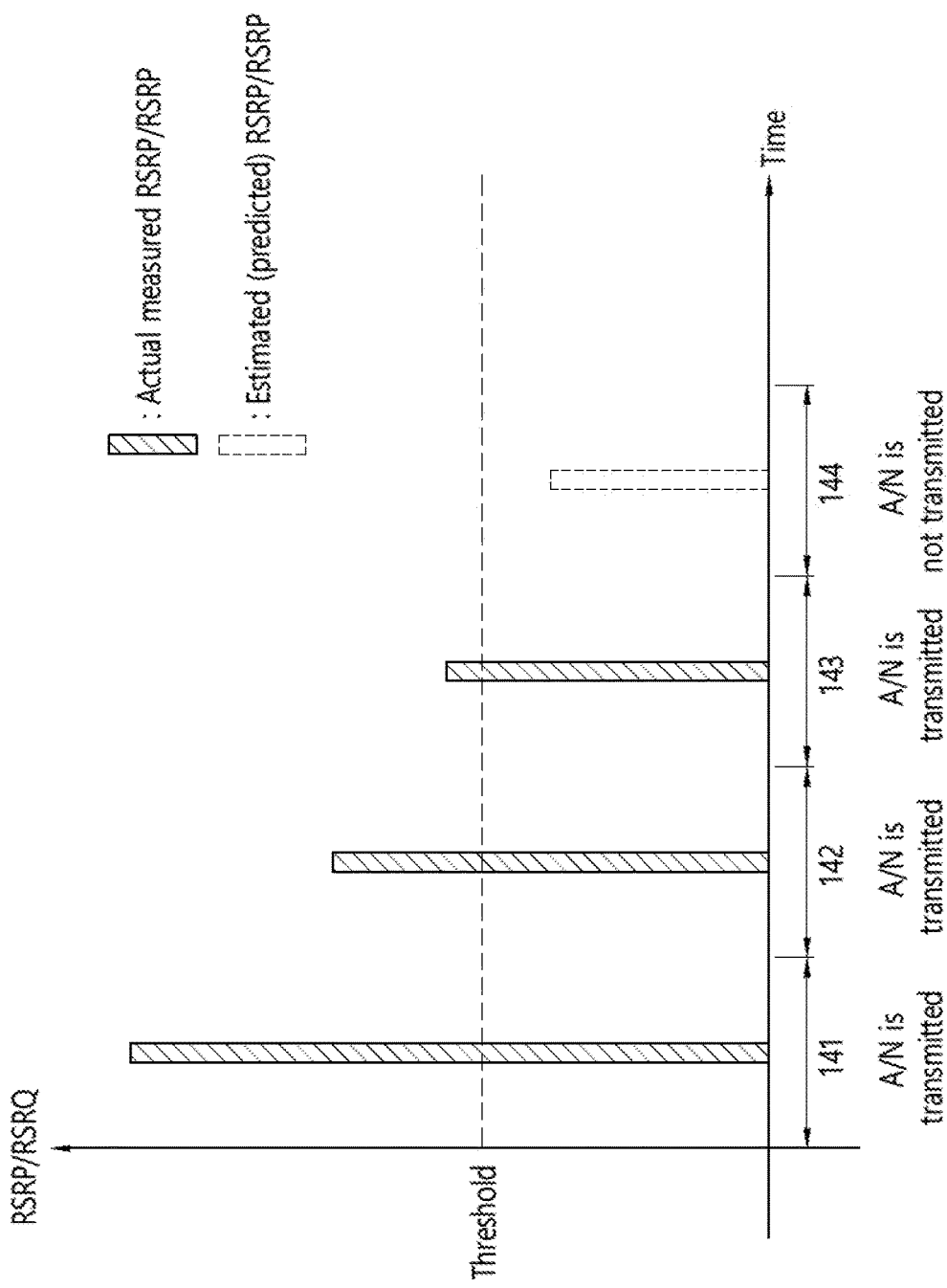
FIG. 14 shows an example of deciding whether to give HARQ feedback by analyzing the measured RSRP/RSRQ extensively in the time domain.

FIG. 14 shows an example of deciding whether to give HARQ feedback by analyzing the measured RSRP/RSRQ extensively in the time domain.

Referring to FIG. 14, a terminal may periodically measure the RSRP/RSRQ by using a reference signal transmitted by another terminal. For instance, a terminal may measure the RSRP/RSRQ by using a reference signal transmitted by another terminal at times 141, 142, and 143. In this case, it is assumed that the RSRP/RSRQ measured at times 141, 142, and 143 decreases gradually. Also, it is assumed that the RSRP/RSRQ at time 144 is expected to decrease to a threshold or below.

In this case, the terminal may decide whether to give HARQ feedback or not at time 144 by extensively applying/analyzing the existing measurement result, without needing to actually measure the RSRP/RSRQ at time 144. That is, if the measured RSRP/RSRQ at time 144 is expected/estimated to be at a threshold or below, taking account of the rate of change in the measured RSRP/RSRQ at times 141, 142, and 143, no HARQ feedback may be given at time 144.

In an example, when there are vehicles traveling in the opposite direction, the measured RSRP/RSRQ may be shown in the pattern of FIG. 14. In this case, the RSRP/RSRQ over a future period (including time 144) may be predicted from the RSRP/RSRQ over a past period (including times 141, 142, and 143), in order to avoid HARQ feedback at time 144. If a vehicle driving away in the opposite direction makes a U-turn and drives back, the RSRP/RSRQ will increase again after a given amount of time. In this case, HARQ feedback may be permitted again depending on how the RSRP/RSRQ changes.

Since it may be difficult to predict a future behavior of a vehicle, the change in RSRP/RSRQ will be predicted and reflected only when the following conditions are met. In other situations, whether to give feedback or not may be decided by comparing the measured RSRP/RSRQ with a threshold at a specific point in time.

1) The measured RSRP/RSRQ is maintained in a specific RSRP/RSRQ threshold range for a given amount of time.

2) The average rate of change in RSRP/RSRQ (e.g., the rate of change/time of RSRP/RSRQ is at or above (or later than) a specific threshold.

The threshold may have a fixed value, or may be signaled directly to a UE through higher layer signaling (e.g., RRC signaling) or signaled to a UE through a predefined channel (e.g., PSCCH).

The rate of change of RSRP/RSRQ may apply differently to each transmitting UE, and each transmitting UE may be identified through the ID of each transmitting UE. Periodical messages may be distinguished by measuring resources reserved until resource reselection occurs.

3) The RSRP/RSRQ value measured based on the distance between vehicles, which is obtained by location information (e.g., GPS, positioning), is maintained.

In an example, the distance from a UE that has transmitted a measured RSRP/RSRQ is found out through location information and the current or future change in RSRP/RSRQ is predicted based on the distance observed over time and a set of measured RSRPs/RSRQs.

A UE is within the coverage of a message for a specific service based on location information.

Although the present disclosure specifies that the actual distance/radio distance can be used in deciding whether to give feedback or not, this information is used not only in deciding whether to give feedback or not but also in determining the status or quality of feedback and different types of feedback (e.g., the statuses of CQI and RSRP/RSRQ).

Figure 15:
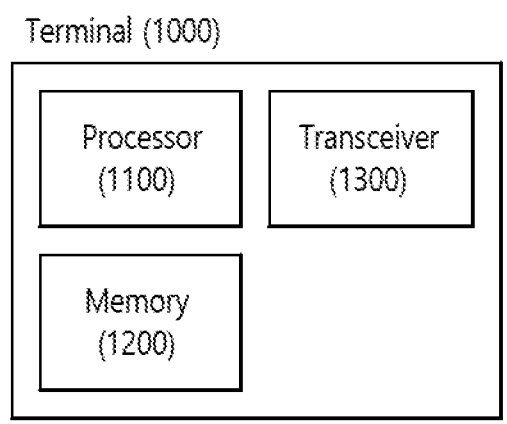
FIG. 15 is a block diagram showing an apparatus by which an embodiment of the present disclosure is implemented.

FIG. 15 is a block diagram showing an apparatus by which an embodiment of the present disclosure is implemented.

Referring to FIG. 15, the apparatus 1000 includes a processor 1100, a memory 1200, and a transceiver 1300. The processor 1100 implements the proposed functions, processes, and/or methods. The apparatus 1000 may be a terminal or a base station. The transceiver 1300 is connected to the processor 1100 to transmit and receive a radio signal. The memory 1200 may store information necessary for the operation of the processor 1100 and may also store a transmission/reception signal.

Figure 16:
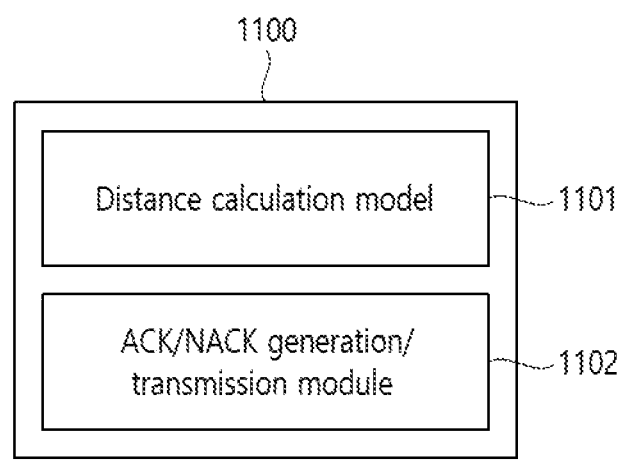
FIG. 16 illustrates an example of configuring the processor 1100.

FIG. 16 illustrates an example of configuring the processor 1100.

Referring to FIG. 16, the processor 1100 may include a distance calculation module 1101 and an ACK/NACK generation/transmission module 1102.

The distance calculation module 1101 may calculate the geographic/radio distance with other terminals. The ACK/NACK generation/transmission module 1102 may create/transmit ACK/NACK differently depending on the geographic/radio distance with other terminals.

The processor may include application-specific integrated circuits (ASICs), other chipsets, logic circuits, and/or data processing devices. The memory may include read-only memory (ROM), random access memory (RAM), flash memory, memory card, storage medium and/or other storage device. The RF unit may include a baseband circuit for processing a radio signal. When the embodiment is implemented in software, the above-described technique may be implemented as a module (process, function, etc.) for performing the above-described function. The module may be stored in memory and executed by a processor. The memory may be internal or external to the processor and may be coupled to the processor by various well known means.

What is claimed is:

1. A method of operating a first terminal for vehicle-to-everything (V2X) communication in a wireless communication system, the method comprising:

receiving, from a second terminal, a first message comprising location information of the second terminal;

receiving, from the second terminal, a second message comprising data; and transmitting a hybrid automatic repeat request (HARQ) feedback for the second message based on a distance between the first terminal and the second terminal determined by the first terminal, wherein the distance is determined based on the location information of the second terminal and location information of the first terminal, wherein based on the distance being equal to or smaller than a specific value, the HARQ feedback is transmitted to the second terminal, wherein based on the distance being larger than the specific value, the HARQ feedback is not transmitted to the second terminal, wherein the distance is also determined based on a reference signal received power (RSRP) or a reference signal received quality (RSRQ) measured using a reference signal received periodically from the second terminal, wherein the distance is determined based on an average rate of temporal change in the RSRP or the RSRQ of the reference signal, and wherein, based on the RSRP or the RSRQ of the reference signal being expected to decrease over time to become equal or less than a threshold after a specific point in time, no HARQ feedback for the received data is transmitted after the specific point in time.

2. The method of claim 1, wherein the first terminal determines that the distance is equal to or smaller than the specific value based on the RSRP or the RSRQ being greater than a threshold.

3. The method of claim 1, wherein the first terminal and the second terminal are terminals installed on vehicles.

4. A first terminal comprising:

a transceiver; and a processor connected to the transceiver, wherein the processor is configured to control the first terminal to perform operations comprising:

receiving, from a second terminal, a first message comprising location information of the second terminal, receiving, from the second terminal, a second message comprising data; and transmitting a hybrid automatic repeat request (HARQ) feedback for the second message based on a distance between the first terminal and the second terminal determined by the first terminal, wherein the distance is determined based on the location information of the second terminal and location information of the first terminal, wherein based on the distance being equal to or smaller than a specific value, the HARQ feedback is transmitted to the second terminal, wherein based on the distance being larger than the specific value, the HARQ feedback is not transmitted to the second terminal, wherein the distance is also determined based on a reference signal received power (RSRP) or a reference signal received quality (RSRQ) measured using a reference signal received periodically from the second terminal, wherein the distance is determined based on an average rate of temporal change in the RSRP or the RSRQ of the reference signal, and wherein, based on the RSRP or the RSRQ of the reference signal being expected to decrease over time to become equal or less than a threshold after a specific point in time, no HARQ feedback for the received data is transmitted after the specific point in time.

5. A computer-readable storage medium storing instructions that, based on being executed by a processor, control a first terminal to perform operations for vehicle-to-everything (V2X) communication in a wireless communication system, the operations comprising:

receiving, from a second terminal, a first message comprising location information of the second terminal;

receiving, from the second terminal, a second message comprising data; and transmitting a hybrid automatic repeat request (HARQ) feedback for the second message based on a distance between the first terminal and the second terminal determined by the first terminal, wherein the distance is determined based on the location information of the second terminal and location information of the first terminal, wherein based on the distance being equal to or smaller than a specific value, the HARQ feedback is transmitted to the second terminal, wherein based on the distance being larger than the specific value, the HARQ feedback is not transmitted to the second terminal, wherein the distance is also determined based on a reference signal received power (RSRP) or a reference signal received quality (RSRQ) measured using a reference signal received periodically from the second terminal, wherein the distance is determined based on an average rate of temporal change in the RSRP or the RSRQ of the reference signal, and wherein, based on the RSRP or the RSRQ of the reference signal being expected to decrease over time to become equal or less than a threshold after a specific point in time, no HARQ feedback for the received data is transmitted after the specific point in time.

6. The first terminal of claim 5, wherein the first terminal determines that the distance is equal to or smaller than the specific value based on the RSRP or the RSRQ being greater than a threshold.

* * * * *